(12) United States Patent
Awad et al.

(10) Patent No.: US 10,138,135 B1
(45) Date of Patent: Nov. 27, 2018

(54) **SYNTHESIS OF TITANIUM DIOXIDE NANOPARTICLES USING *ORIGANUM MAJORANA* HERBAL EXTRACTS**

(71) Applicant: KING SAUD UNIVERSITY, Riyadh (SA)

(72) Inventors: Manal Ahmed Gasmelseed Awad, Riydah (SA); Awatif Ahmed Hendi, Riyadh (SA); Khalid Mustafa Osman Ortashi, Riyadh (SA); Wadha Khalaf Alenazi, Riyadh (SA)

(73) Assignee: King Saud University, Riyadh (SA)

( * ) Notice: Subject to any disclaimer, the term of this patent is extended or adjusted under 35 U.S.C. 154(b) by 0 days.

(21) Appl. No.: 15/961,783

(22) Filed: Apr. 24, 2018

(51) Int. Cl.
*C01G 23/00* (2006.01)
*C01G 23/08* (2006.01)
*C09C 1/36* (2006.01)
*C02F 1/68* (2006.01)
*B82Y 30/00* (2011.01)
*B82Y 40/00* (2011.01)
*C02F 1/30* (2006.01)

(52) U.S. Cl.
CPC .............. *C01G 23/08* (2013.01); *C09C 1/363* (2013.01); *B82Y 30/00* (2013.01); *B82Y 40/00* (2013.01); *C01P 2004/62* (2013.01); *C01P 2004/64* (2013.01); *C02F 1/30* (2013.01); *C02F 1/68* (2013.01)

(58) Field of Classification Search
CPC ......... C01G 23/08; C09C 1/363; B82Y 30/00; B82Y 40/00; C01P 2004/62; C01P 2004/64; C02F 1/30; C02F 1/68
See application file for complete search history.

(56) References Cited

U.S. PATENT DOCUMENTS 6,576,589 B1 6/2003 Na

FOREIGN PATENT DOCUMENTS

| CN | 103464214 A | 12/2013 |
| CN | 105440907 A | 3/2016 |
| CN | 106268728 A | 1/2017 |

OTHER PUBLICATIONS

Hernández-Pinero, Jorge Luis, et al. "Effect of heating rate and plant species on the size and uniformity of silver nanoparticles synthesized using aromatic plant extracts." Applied Nanoscience 6.8 (2016): 1183-1190.*

Sankar et al., "Wound healing activity of Origanum vulgare engineered titanium dioxide nanoparticles in Wistar Albino rats," J Mater Sci: Mater Med, (2014) 25: 1701-1708.

(Continued)

Primary Examiner — Richard M Rump
(74) Attorney, Agent, or Firm — Richard C. Litman

(57) ABSTRACT

Synthesis of titanium dioxide nanoparticles using *Origanum majorana* (*O. majorana*) herbal extracts may be achieved by mixing Titanium (IV) isopropoxide (TTIP) with *O. majorana* extracts. The *O. majorana* herbal extracts may be extracts obtained using boiled water. The TTIP may be mixed with the *O. majorana* extract at a ratio of 2:1. The resulting paste may be heated and pounded into a powder. The powder may then be calcinated in a muffle furnace, producing *O. majorana* titanium dioxide nanoparticles. The *O. majorana* titanium dioxide nanoparticles may be efficient photocatalysts.

12 Claims, 5 Drawing Sheets

(56) References Cited

OTHER PUBLICATIONS

Behnajady et al., "Investigation of the effect of sol-gel synthesis variables on structural and photocatalytic properties of TiO2 nanoparticles," Desalination, vol. 278, Issues 1-3, Sep. 1, 2011, pp. 10-17.

Darus et al., "Degradation of Rhodamine B Dye by TiO2 Nanotubes Photocatalyst Synthesized via Alkaline Hydrothermal Method," MATEC Web of Conferences, 27, 2015.

Hariharan et al., "Synthesis and Characterization of TiO2 Nanoparticles Using Cynodon Dactylon Leaf Extract for Antibacterial and Anticancer," Journal of Nanomedicine Research, vol. 5, Issue 6, Jul. 21, 2017.

* cited by examiner

SYNTHESIS OF TITANIUM DIOXIDE NANOPARTICLES USING *ORIGANUM MAJORANA* HERBAL EXTRACTS

BACKGROUND

1. Field

The disclosure of the present patent application relates to nanoparticles, and particularly to synthesis of titanium dioxide nanoparticles using *Origanum majorana* herbal extracts.

2. Description of the Related Art

In recent years, transition metal oxide semiconductors have been studied extensively. Titanium dioxide ($TiO_2$) is an important semiconductor material and is generally a main component of paints, pigments, cosmetics and foodstuffs. $TiO_2$ may be used in sterilization or disinfection, prevention of stains, gas sensors, self-cleaning windows, electron chromic devices, anti-reflection coatings for photovoltaic cells, catalytic oxidation of carbon monoxide and photodegradation of organic pollutants in water and air. Photocatalysis uses light to activate a catalytic material that breaks down pollutants. Photocatalysis has significant potential in environmental applications, but has not yet been successfully deployed on a commercial scale.

Common methods for preparing titanium dioxide include multistage processes with filtration, sintering, milling, and dispersion steps. These approaches may result in high production costs and significant waste of starting materials.

Thus, a method of synthesis of titanium dioxide nanoparticles using *Origanum majorana* herbal extracts solving the aforementioned problems is desired.

SUMMARY

The synthesis of titanium dioxide nanoparticles using *Origanum majorana* (*O. majorana*) herbal extracts may be achieved by mixing Titanium (IV) isopropoxide (TTIP) with *O. majorana* extracts. The *O. majorana* herbal extracts may be extracts obtained using boiled distilled water. The TTIP may be mixed with the *O. majorana* extract at a ratio of 2:1. The resulting paste may be heated and pounded into a powder. The powder may then be calcinated in a muffle furnace to produce *O. majorana* titanium dioxide nanoparticles.

These and other features of the present disclosure will become readily apparent upon further review of the following specification and drawings.

DETAILED DESCRIPTION OF THE PREFERRED EMBODIMENTS

Synthesis of titanium dioxide nanoparticles using *Origanum majorana* (*O. majorana*) herbal extracts may be achieved by mixing Titanium (IV) isopropoxide (TTIP) with *O. majorana* extracts. The *O. majorana* herbal extracts may be extracts obtained using boiled distilled water. The TTIP may be mixed with the *O. majorana* extract at a ratio of 2:1. The resulting paste may be heated and pounded into a powder. The powder may then be calcinated in a muffle furnace, producing *O. majorana* titanium dioxide nanoparticles ("*O. majorana* $TiO_2$ NPs").

The *O. majorana* $TiO_2$ NPs may include a composition of titanium dioxide nanoparticles and components of *O. majorana* extract adsorbed on the surface of the titanium dioxide nanoparticles. The *O. majorana* $TiO_2$ NPs may have an average diameter of 238.0 nanometers, with a standard deviation of 75.59 nanometers. For example, the *O. majorana* $TiO_2$ NPs may have a diameter ranging from about 162.41 nanometers to about 313.59 nanometers. The *O. majorana* $TiO_2$ NPs may be hexagonal and irregular in shape.

When exposed to ultraviolet light, the *O. majorana* $TiO_2$ NPs demonstrate excellent degradation efficiency, suggesting a significant potential application as photocatalysts, and particularly for water purification processes including direct solar irradiation.

The present teachings are illustrated by the following examples.

Example 1

Method of Producing *O. majorana* Titanium Dioxide Nanoparticles

*O. majorana* (*Murdagoosh*) plant parts (10g) were washed, dried, and ground. The ground *O. majorana* was then soaked overnight in 100 ml boiled distilled water. The resulting extract was filtered twice and the final filtrates were used for preparation of the titanium dioxide nanoparticles.

TTIP was mixed with the *O. majorana* final filtrate at a ratio of 2:1 under constant stirring conditions, resulting in a yellowish paste. The paste was heated on a hot plate at 80° C. The heated paste was pounded into a powder and the powder was calcinated in a muffle furnace at 450° C. for 5 hours, producing a beige powder including *O. majorana* titanium dioxide nanoparticles (*O. majorana* $TiO_2$ NPs).

Example 2

X-Ray Diffraction of *O. majorana* $TiO_2$ Nanoparticles

Figure 1:
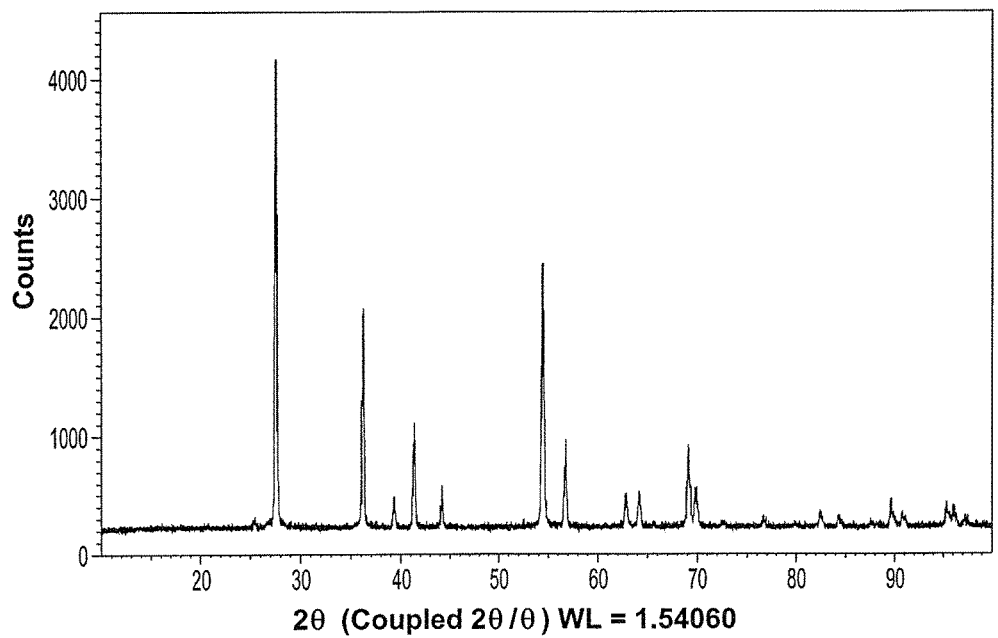
FIG. 1 is an X-Ray diffraction pattern of titanium dioxide nanoparticles synthesized using *Origanum majorana* herbal extracts.

FIG. 1 illustrates X-ray diffraction (XRD) pattern measurements of the *O. majorana* $TiO_2$ NPs obtained according to the method of Example 1. These *O. majorana* TiO₂ NPs have diffraction peaks at 2θ values of 27.283°, 35.980°, 38.388°, 41.220°, 54.274°, 54.825°, 56.443°, 68.523°, 69.791° and 74.811°. These peaks have the combined characteristics of Ti(OCH(CH₃)₂)₄ and the plant aqueous extract. The XRD pattern shows eight intense peaks in the whole spectrum of 2θ values. A few unassigned peaks were also noticed in the vicinity of the characteristic peaks. The XRD results suggest that crystallization of the bio organic phase occurs on the surface of the *O. majorana* TiO₂ NPs.

Example 3

Figure 2:
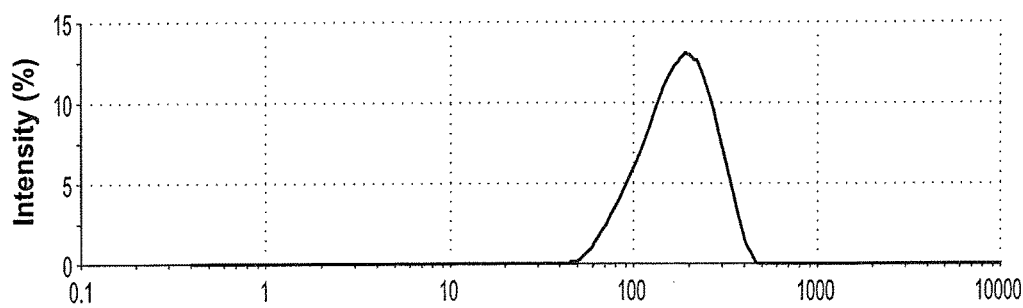
FIG. 2 is a graph of particle size distribution of titanium dioxide nanoparticles synthesized using *Origanum majorana* herbal extracts.

Dynamic Light Scattering Measurements of *O. majorana* Titanium Dioxide Nanoparticles Dynamic light scattering characterizes the size of colloidal dispersions, utilizes the illumination of a suspension of particles or molecules undergoing Brownian motion by a laser beam. FIG. 2 illustrates the size distribution of the *O. majorana* TiO₂ NPs as determined by Dynamic Light Scattering. This graph demonstrates that the *O. majorana* TiO₂ NPs are polydisperse mixtures with a peak centered on 186.2 nanometers in diameter, a standard deviation of 75.59 nanometers, and an average diameter of about 238.0 nanometers.

Example 4

Figure 3B:
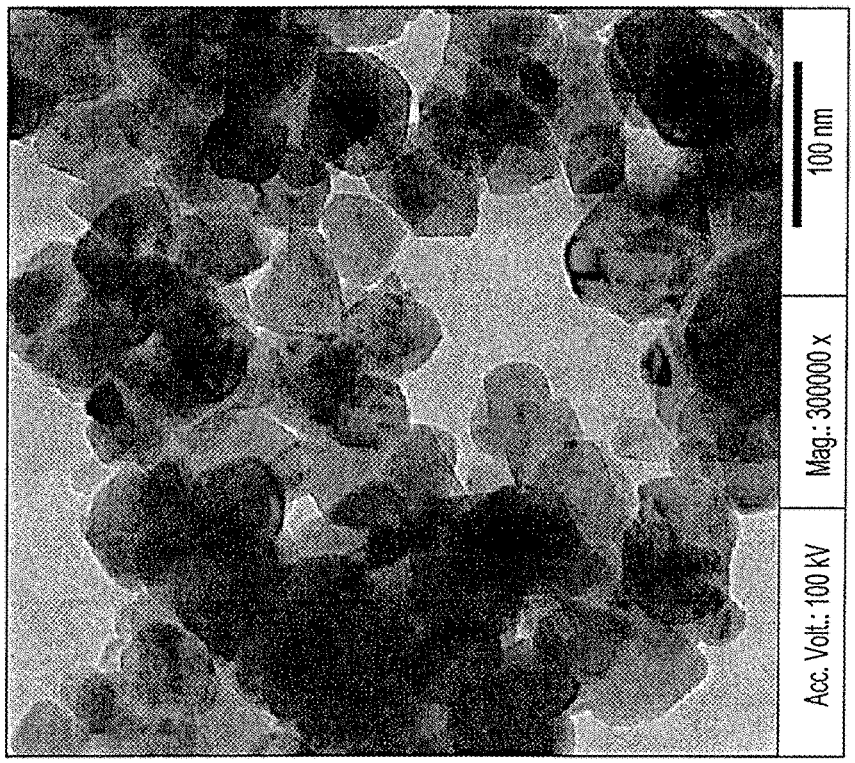
FIG. 3B is a Transmission Electron Micrograph of titanium dioxide nanoparticles synthesized using *Origanum majorana* herbal extracts.
Figure 3A:
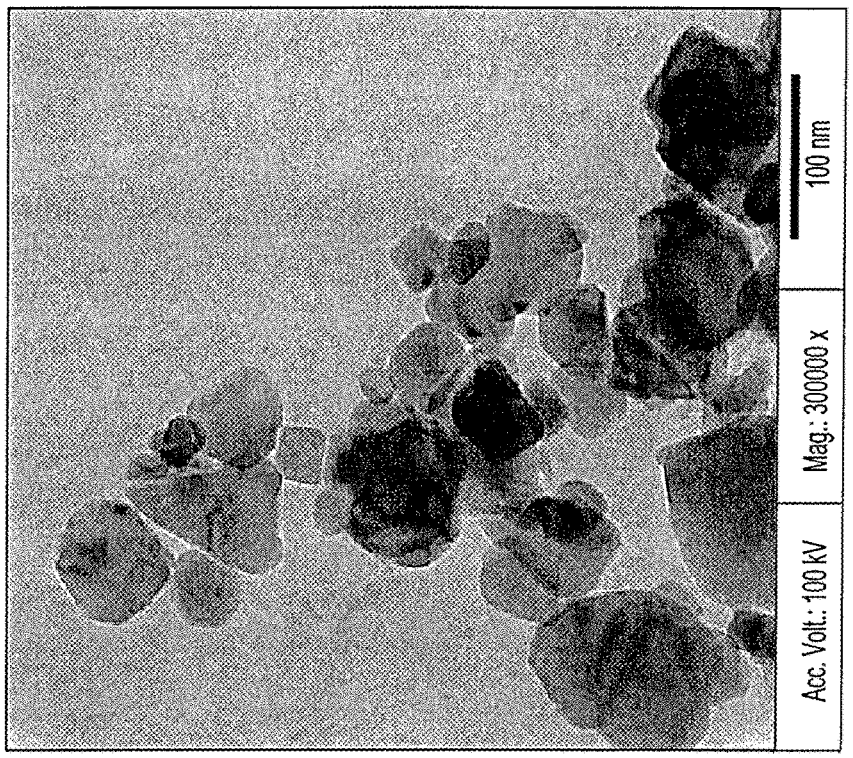
FIG. 3A is a Transmission Electron Micrograph of titanium dioxide nanoparticles synthesized using *Origanum majorana* herbal extracts.

Transmission Electron Microscopy of *O. majorana* Titanium Dioxide Nanoparticles Transmission electron microscopy was used to characterize the morphology, crystallinity, and size of the *O. majorana* TiO₂ nanoparticles. As shown in FIGS. 3A-3B, the *O. majorana* TiO₂ nanoparticles are generally hexagonal and irregular in shape, with moderate variation in size.

Example 5

Chemical Composition of *O. majorana* Titanium Dioxide Nanoparticles

Figure 4B:
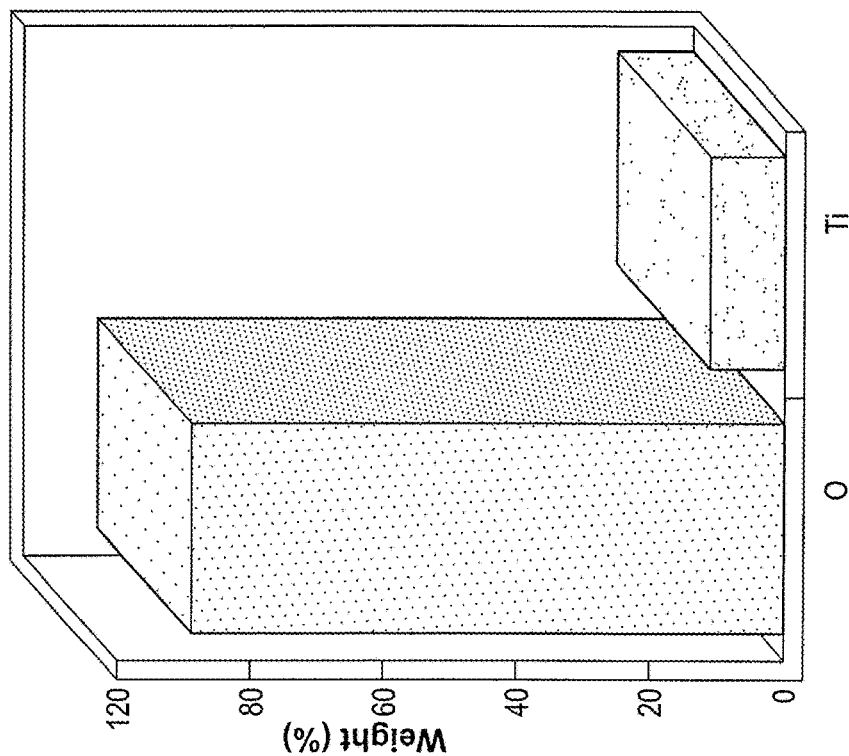
FIG. 4B is a graph of the chemical composition of titanium dioxide nanoparticles synthesized using *Origanum majorana* herbal extracts.
Figure 4A:
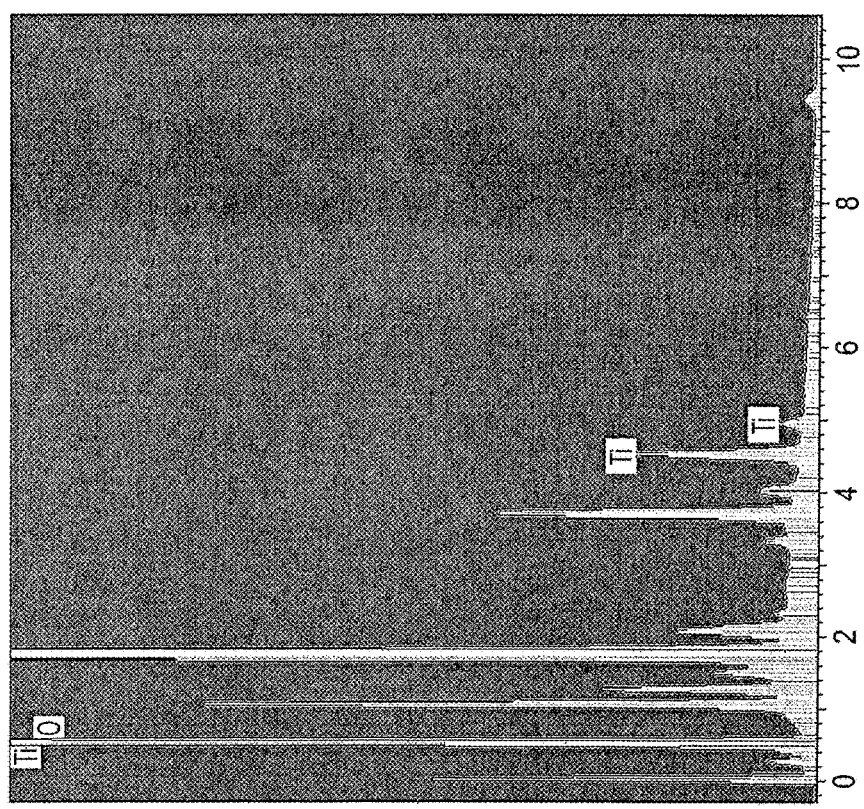
FIG. 4A is an Energy Dispersive X-ray Spectrograph of titanium dioxide nanoparticles synthesized using *Origanum majorana* herbal extracts.

Energy Dispersive Spectroscopy confirms the synthesis of crystalline *O. majorana* TiO₂ nanoparticles. As seen in FIGS. 4A-4B, Oxygen and Titanium are present along with further peaks indicating the presence of additional organic moieties adsorbed on the surface of the *O. majorana* TiO₂ nanoparticles.

Example 6

FTIR Analysis of *O. majorana* Titanium Dioxide Nanoparticles

Figure 5:
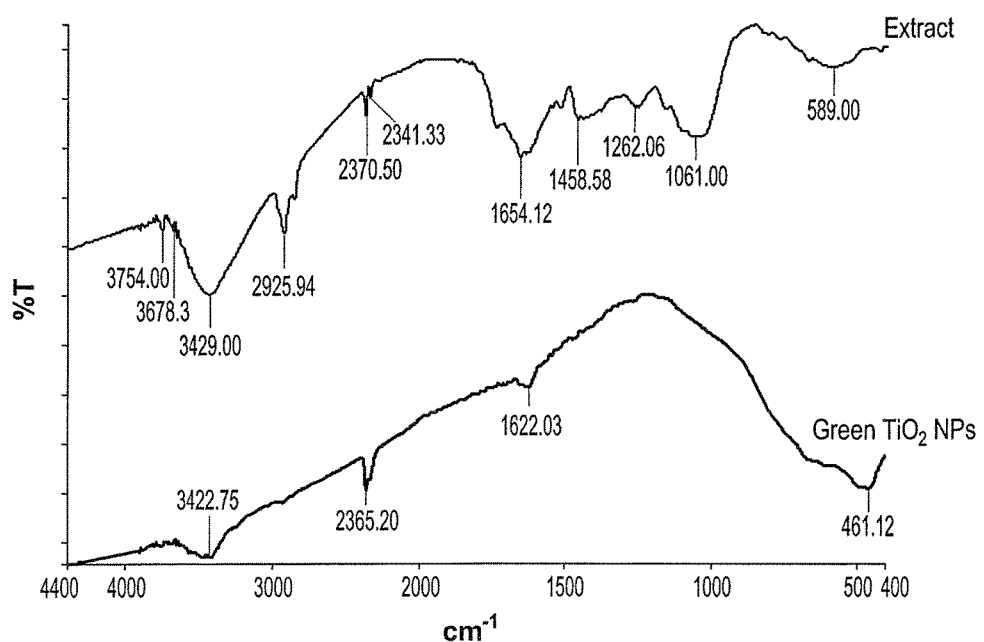
FIG. 5 is a pair of Fourier-Transform Infrared Spectrographs of titanium dioxide nanoparticles synthesized using *Origanum majorana* herbal extracts, and of *Origanum majorana* herbal extracts.

FIG. 5 illustrates Fourier-Transform Infrared Spectroscopy of the *O. majorana* extract and the *O. majorana* TiO₂ nanoparticles produced according to Example 1. The *O. majorana* TiO₂ nanoparticle spectrum has a diffraction peak centered at 461.12 cm⁻¹, which is characteristic of Ti—O bending mode of vibration, confirming the formation of metal-oxygen bonds. The strong and broad peak at 400-1000 cm⁻¹ is characteristic of the Ti—O lattice vibration in TiO₂ crystals.

Example 7

Photocatalytic Measurements of *O. majorana* Titanium Dioxide Nanoparticles

Photocatalytic activity was evaluated using a degradation test. Briefly, photocatalytic activity was evaluated under UV irradiation with a Rhodamine B dye. Laboratory scale cuvettes were prepared with 20 ml of a dye solution and *O. majorana* titanium dioxide nanoparticles were dispersed within the cuvette. The cuvette was then positioned 5 cm from a UV lamp under continuous stirring conditions and optical absorption spectra were recorded upon different light exposure durations using a UV/Vis spectrophotometer. The degradation rate was determined by recording the reduction in absorption intensity of the dye at a maximum wavelength (λmax=553 nm). The degradation efficiency (DE) was calculated using Equation 1.

$$DE\ \% = \frac{(A_0 - A)}{A_0} \times 100 \qquad \text{Equation 1}$$

Figure 6:
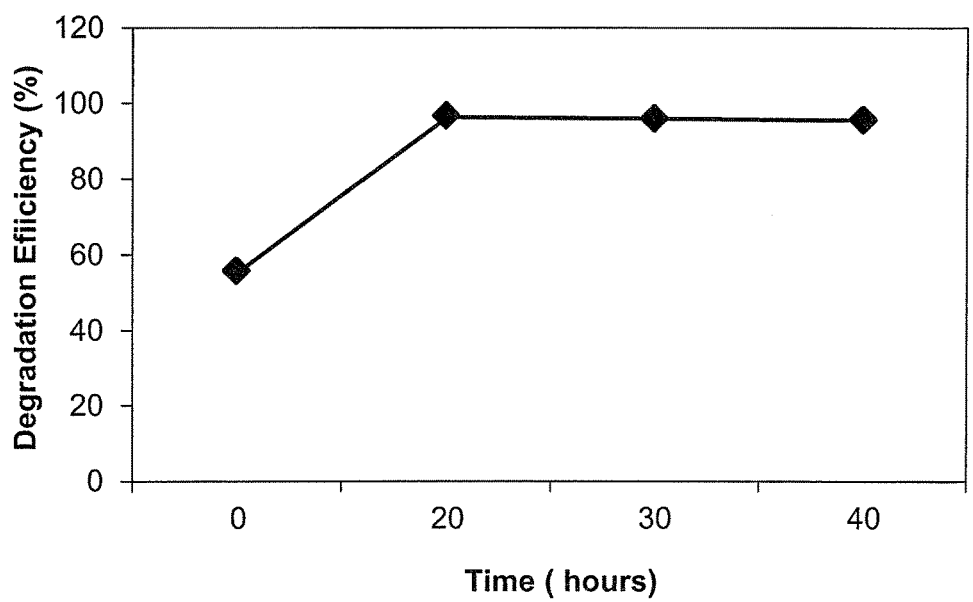
FIG. 6 is a graph of the degradation efficiency of titanium dioxide nanoparticles synthesized using *Origanum majorana* herbal extracts and treated with UV irradiation.

In Equation 1, $A_0$ is the initial absorption intensity of wastewater at λmax=553 nm and A is the absorption intensity after photodegradation. As expected, the green TiO₂ nanoparticles demonstrated a good response under UV irradiation where the DE reached 100% after 20 hours of irradiation (FIG. 6). These results are likely due to the increase in number of active sites and photons absorbed by catalyst. The excellent degradation efficiency of the green *O. majorana* TiO₂ nanoparticles suggests that they will act as efficient photocatalysts for water treatment applications under direct solar irradiation.

It is to be understood that the synthesis of titanium dioxide nanoparticles using *Origanum majorana* herbal extracts is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A method of synthesis of titanium dioxide nanoparticles using *Origanum majorana* herbal extracts, comprising:
   providing *Origanum majorana* plant material;
   grinding the *Origanum majorana* to produce ground *Origanum majorana*;
   soaking the ground *Origanum majorana* in boiled distilled water to produce an *Origanum majorana* extract;
   mixing Titanium (IV) isopropoxide with the *Origanum majorana* extract to produce a paste;
   heating and pounding the paste to produce a powder; and
   calcinating the powder to produce *O. majorana* titanium dioxide nanoparticles.

2. The method of synthesis of titanium dioxide nanoparticles using *Origanum majorana* herbal extracts of claim 1, wherein:
   the ground *O. majorana* is soaked in boiled distilled water overnight; and
   the powder is calcinated in a muffle furnace at 450° C. for five hours.

3. The method of synthesis of titanium dioxide nanoparticles using *Origanum majorana* herbal extracts of claim 1, wherein the *O. majorana* titanium dioxide nanoparticles include titanium dioxide nanoparticles with *O. majorana* extract components adsorbed to the surface of the titanium dioxide nanoparticles.

4. The method of synthesis of titanium dioxide nanoparticles using *Origanum majorana* herbal extracts of claim 1, wherein the *O. majorana* titanium dioxide nanoparticles have a diameter ranging from 162.41 to 313.59 nanometers.

5. The method of synthesis of titanium dioxide nanoparticles using *Origanum majorana* herbal extracts of claim 4, wherein the *O. majorana* titanium dioxide nanoparticles have an average diameter of 238 nanometers.

6. The method of synthesis of titanium dioxide nanoparticles using *Origanum majorana* herbal extracts of claim 1, wherein the *O. majorana* titanium dioxide nanoparticles are hexagonal in shape.

7. The method of synthesis of titanium dioxide nanoparticles using *Origanum majorana* herbal extracts of claim 1, wherein the Titanium (IV) isopropoxide and the *Origanum majorana* extract are mixed at a 2:1 ratio under constant stirring to produce the paste.

8. *O. majorana* titanium dioxide nanoparticles produced according to the method of claim 1.

9. A titanium dioxide nanoparticle composition comprising a titanium dioxide nanoparticle and an *Origanum majorana* extract component adsorbed to a surface of the titanium dioxide nanoparticle.

10. The titanium dioxide nanoparticle composition of claim 9, wherein the titanium dioxide nanoparticle composition is hexagonal.

11. The titanium dioxide nanoparticle composition of claim 9, wherein the titanium dioxide nanoparticle composition has a particle size ranging from about 162.41 nanometers to about 313.59 nanometers.

12. A method of purifying water, comprising contacting water with the titanium dioxide nanoparticle composition of claim 9, under solar irradiation.

* * * * *